United States Patent
Nilsson

[11] 3,728,846
[45] Apr. 24, 1973

[54] ARRANGEMENT FOR A MOTOR VEHICLE FUEL SYSTEM

[75] Inventor: Dan Leo Nilsson, Sjuntorp, Sweden

[73] Assignee: Saab-Scania Aktiebolag, Linkoping, Sweden

[22] Filed: July 22, 1971

[21] Appl. No.: 165,122

[30] Foreign Application Priority Data

Aug. 3, 1970 Sweden ............................... 10623/70

[52] U.S. Cl. .................... 55/159, 55/316, 55/385, 55/387, 55/418, 55/519, 55/DIG. 28, 123/119 R, 220/86, 261/72
[51] Int. Cl. ................................................ B01b 53/06
[58] Field of Search ..................... 55/DIG. 28, 316, 55/385, 387, 159, 79, 418, 519; 123/119 B, 136; 261/72; 220/86

[56] References Cited

UNITED STATES PATENTS

| | | | |
|---|---|---|---|
| 2,894,736 | 7/1959 | Wentworth | 123/136 X |
| 3,191,587 | 6/1965 | Hall | 55/316 X |
| 3,515,108 | 6/1970 | Deeter et al. | 55/316 X |

*Primary Examiner*—Frank W. Lutter
*Assistant Examiner*—William Cuchlinski, Jr.
*Attorney*—Cushman, Darby & Cushman

[57] ABSTRACT

The present invention relates to an arrangement for a motor vehicle fuel system. The arrangement comprises a fuel tank, a filler tube connected to the fuel tank and being sealable by a tank cap and a vent line opening into said fuel tank, the vent line being divided into at least two parts, e.g. a lower and an upper vent line. The vent line is connected to a filter means, which is connected to the intake system of the motor. This filter is capable of accumulating and filtering fuel vapors coming from the fuel tank, so that these vapors will not pollute the atmosphere. Instead, the vapors are sucked into the motor and burned when the motor is operating. The arrangement is chiefly characterized in tat the lower vent line, which is connected to the fuel tank, and one end of the upper vent line open into the filler tube at a place adjacent to the tank cap. Further, the end of the lower vent line opening into the filler tube can be sealed by means of a valve operated by the tank cap, the valve being arranged to close when the tank cap is removed and to open when the tank cap is mounted, and further, the upper vent line between the filler tube and the filter reaches, in a previously known way, substantially up to the highest point of the vehicle and constitutes a liquid trap for a gas-liquid mixture destined for the filter means.

3 Claims, 6 Drawing Figures

Patented April 24, 1973
3,728,846
2 Sheets-Sheet 1
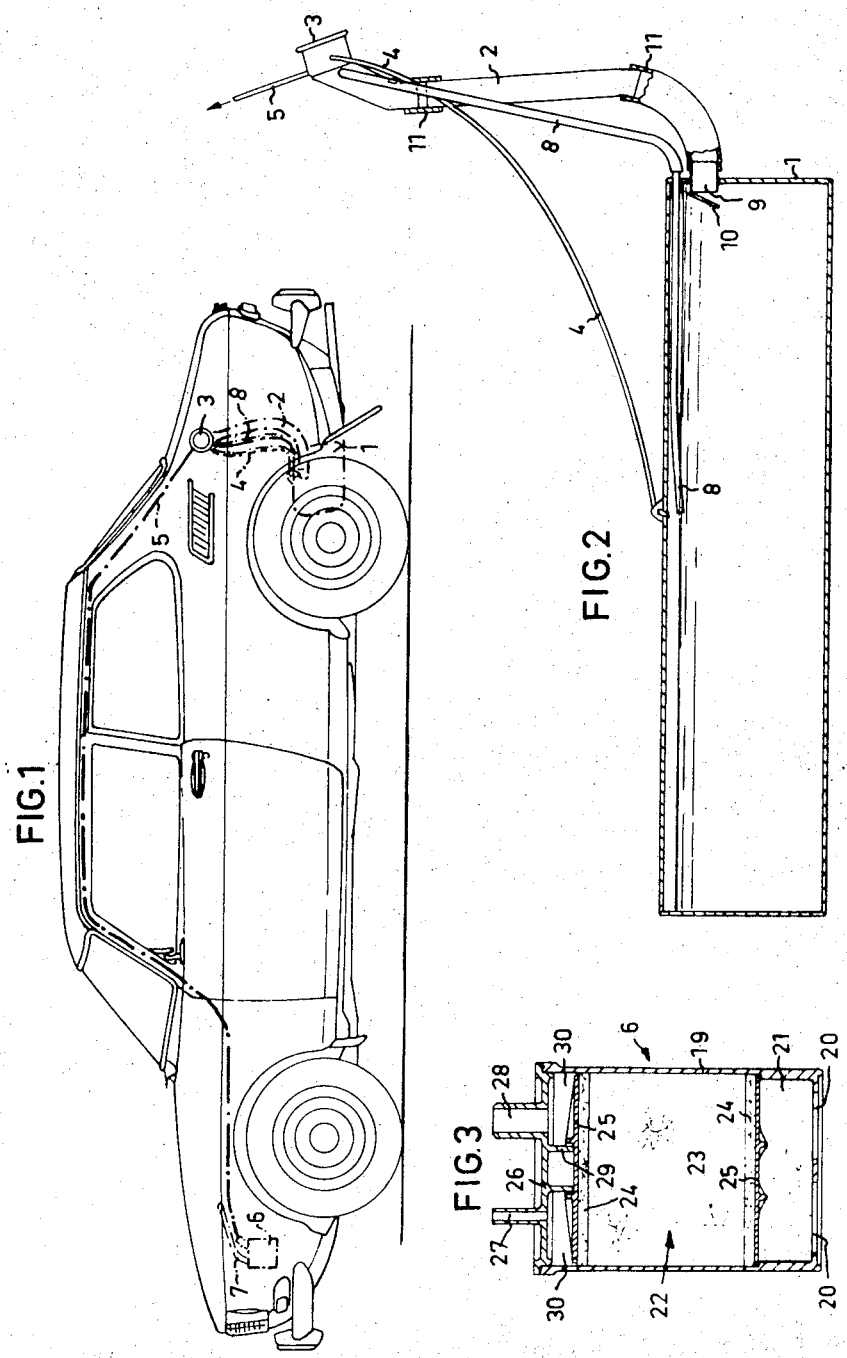

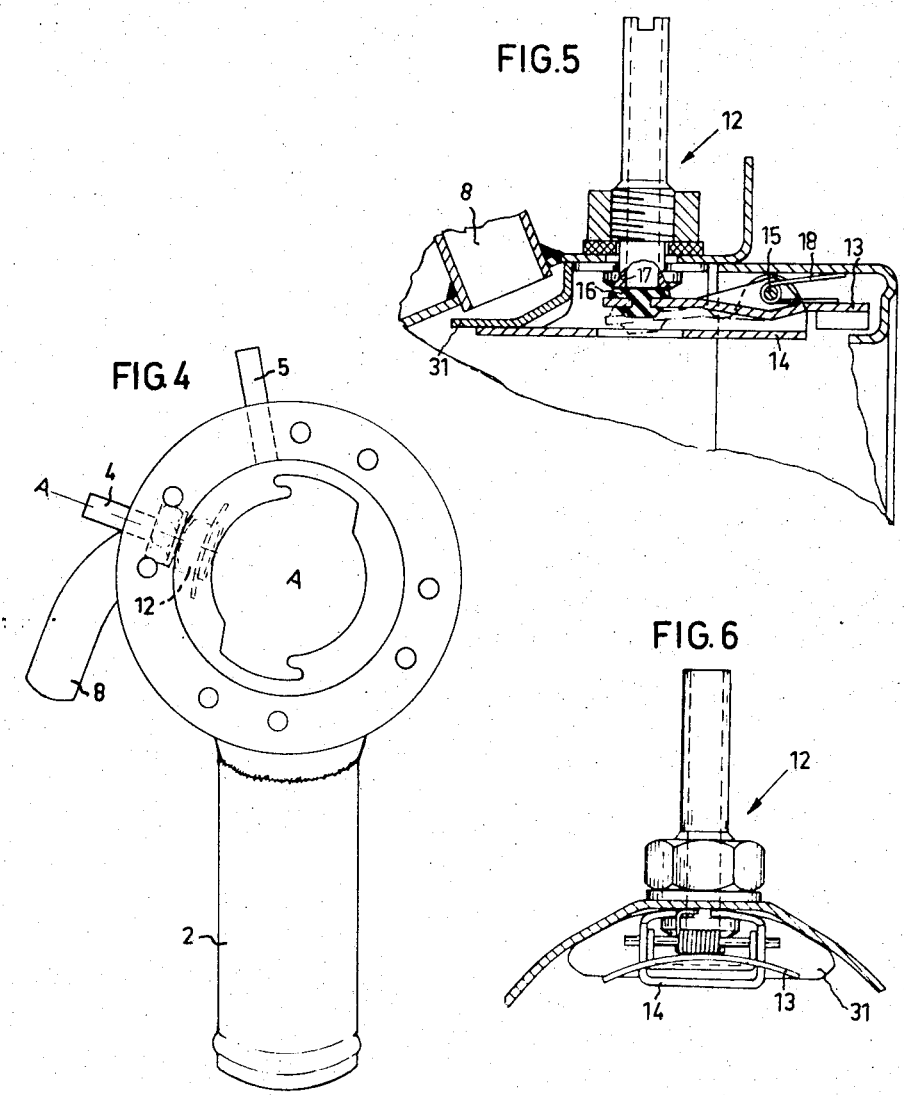

ARRANGEMENT FOR A MOTOR VEHICLE FUEL SYSTEM

The present invention relates to an arrangement for a motor vehicle fuel system. The arrangement comprises a fuel tank, a filler tube connected to the fuel tank and being sealable by a tank cap, and a vent line opening into said fuel tank, the vent line being divided into at least two parts, e.g. a lower and an upper vent line. The vent line is connected to a filter, which is connected to the intake system of the motor. This filter is capable of accumulating and filtering fuel vapors coming from the fuel tank, so that these vapors will not pollute the atmosphere. Instead, the vapors are sucked into the motor and burned when the motor is operating.

With regard to air pollution caused by motor vehicles, efforts to date have been concentrated on different ways of decreasing the amount of pollutants from exhaust gases expelled from the motor. Another factor involved and which has not yet been given greater attention is that many motor vehicles release totally unburned fuel gases into the atmosphere. The reason for this is that vapors from the fuel tank in most vehicles are released directly into the surrounding atmosphere via a vent line from the fuel tank. The thereby emitted amount of air pollutants can be considerable, particularly in areas with high temperatures where fuel evaporation is great. This fact combined with the density of motor vehicle traffic can result in the air inhaled being directly unhealthy.

This invention aims at producing an arrangement which prevent fuel vapors from escaping out into the surrounding air when the vehicle is parked. Instead, the vapors are accumulated in a device in the vehicle and, when the motor is running, are sucked into the motor and burned. The invention also aims at providing an arrangement of this type reliable and simple in structure.

This is achieved, according to the invention, by letting the lower vent line which is connected to the fuel tank, and one end of the upper vent line open into the filler tube at a place adjacent to the tank cap. The end of the lower vent line opening into the filler tube can be sealed by means of a valve operated by the tank cap. The valve closes when the tank cap is removed and opens when the tank cap is mounted. The upper vent line between the filler tube and the filter reaches, in a previously known way, substantially up to the highest point of the vehicle and constitutes a liquid trap for a liquid-gas mixture destined for the filter. The herein described arrangement replaces known, complicated and expensive systems, and is simple in structure and reliable. By utilizing the height of the vehicle body for leading the vent line, a great difference in height is obtained, and since the motor and the fuel tank in most vehicles are basically placed at opposite ends of the vehicle, there is a descent in both directions in the vent line. This makes the formation of possible liquid seals more difficult.

A particularly advantageous embodiment is obtained when the lower vent line opens into the filler tube through the valve, which is fixedly mounted in the upper part of the filler tube. With this arrangement, the tank cap operates the valve directly, and so a compact design is obtained.

It is further advantageous when an evacuation pipe between the fuel tank and the upper part of the filler tube opens into the fuel tank at such a place that an air pocket is formed in the fuel tank when fuel is pumped in. The volume of this air pocket is essentially equal to the volume inside of that portion of the filler tube which is located above the level of the fuel tank. With this arrangement, the filling of the tank is regulated in a simple manner, thus negating the need for previously known boxes, or similar means which are placed in the fuel tank to control the filling of the tank.

The invention is further explained below with the help of an embodiment shown on the enclosed drawings where FIG. 1 is a side view of the placement of the separate fuel vapor separating components in a vehicle;

FIG. 2 shows, partially in section, the fuel tank with accompanying lines;

FIG. 3 shows the filter in longitudinal section;

FIG. 4 is a side view of the upper part of the filler tube;

FIG. 5 illustrates a section, along the line A—A in FIG. 4, of the valve for the vent line; and FIG. 6 is a view of the valve in FIG. 5.

In the vehicle shown in FIG. 1, the fuel tank 1 is provided with a filler tube 2 which opens into the side of the vehicle and is sealed by a tank cap 3. A lower vent line 4 also opens into the upper part of the fuel tank 1; the upper end of this lower vent line opens into the upper part of the filler tube 2 (see also FIGS. 2 and 4). An upper vent line 5 continues from the upper part of the filler tube 2 to a filter 6 which is preferably placed in the motor compartment in the front part of the vehicle. A line 7 runs from this filter to the motor's intake system. There is also an evacuating pipe 8 between the fuel tank 1 and the upper part of the filler tube 2.

An outlet 9 on the filler tube 2 sticks into an end wall or long side of the fuel tank 1 which is box-shaped and conventionally designed. This outlet 9 is sealable by means of a rocker flap 10, or similar device (see FIG. 2). The lower vent line 4 opens into the roof of the fuel tank, preferably at its highest point. The evacuation pipe 8 opens somewhat below this and at a level higher than the level for the outlet 9. The filler tube consists preferably of a plurality of parts, resiliently and tightly held together by sleeves 11 of a suitable material.

The lower vent line opens with its top part into a valve 12 which is secured in the upper portion of the filler tube and is essentially on the inside of said filler tube (see FIGS. 4–6). The arm 13 is operated by the tank cap 3 and is pivoted in the valve body 14 at 15. At one of its ends, the arm 13 supports a gasket 16 of deformable, sealing material, preferably rubber or rubber-like. The gasket can be made to bear against the valve seat 17, with which the lower vent line 4 is in communication. The opposite end of the arm 13 is depressed by a spring device 18, whereby the valve 12 can be closed when the tank cap is removed. When the tank cap 3 is set on, the spring-loaded end of the arm 13 is forced upwards by a cam, or the like, attached to the tank cap, and the valve is opened and remains open as long as the tank cap sits in place. Also on the valve body 14 is a protective plate 31 for the opening of the evacuation pipe 8. This plate is designed to prevent fuel from penetrating the evacuation pipe when the fuel tank is being filled. The valve 12 can, of course, also have another design as long as it is based on the same idea.

The upper vent line 5 is led through the upper portion of the vehicle body and must, therefore, consist of a material, preferably metal, and have a design which fill present safety norms for lines in vehicle bodies. The substantial difference in levels constitutes an effective liquid stopper. Thus, only fuel gases penetrate to the filter 6 (see FIG. 3) which is preferably placed in close communication with the motor and its intake system. The filter 6 comprises an open canister 19, preferably metal. The bottom of the canister 19 is provided with a plurality of perforations 20 and serves as an air intake. Therefore, there is an air filter element 21 above this bottom and it consists preferably of foam plastics or similar material. Placed above the air filter element 21 is a filter portion 22 consisting of a filter element 23 which, in its top and bottom sides respectively, is bordered by a thin layer 24 of air pervious material, preferably foam plastics. Placed outside the layers 24 are filter element bottoms 25 that are perforated, have a certain rigidity and are intended to hold the filter portion 22 together. The filter element 23 should consist of active carbon, preferably powdered active coconut carbon. Tests have shown that it is suitable to have the carbon grains with a surface size of 600–1,000 $m^2/g$. The canister 19 is sealed by a lid 26 which is preferably welded on by ultrasonic welding and which is provided with holes 27 and 28 that are connected to the upper vent line 5 and to the line 7 respectively. The lid 26 also has a central collar 29 which bears against the upper filter element bottom 25 in order to fix the filter portion 22 in the canister. Thus, a chamber 30 is formed between the lid 26 and the upper filter element bottom 25, the upper vent line 5 and the line 7 being able to communicate through this chamber via the holes 27 and 28 respectively. The filter may be given a number of different shapes depending, inter alia, on its positioning and the space available. The construction of the filter can be varied without the filter losing its effect.

The tank cap 3 is removed when the fuel tank is being filled, and the valve 12 is closed. The amount of air present in the fuel tank can at first leave through the evacuation pipe 8; but when the fuel level exceeds the pipe opening, the air no longer has an escape route and the fuel will therefore rise in the filler tube until it reaches a level where the tanking pump shuts off. When the tank cap is applied, the valve 12 will be opened and the air caught in the tank, which air has a volume essentially equal to the volume of the portion of the filler tube situated above the level of the fuel tank, is forced out through the vent line 4 so that a fuel level common to the fuel tank and the filler tube is obtained. The placing apart of the vent lines 4 and 5 in the filler tube causes the possibly accompanying liquid in the vent line 4 to be separated, and the fuel vapors continue via the upper vent line 5 to the filter 6 where they are accumulated and separated. Cleaned air continues out into the surrounding atmosphere via the perforations 20. A corresponding cycle takes place during fuel evaporation when the vehicle is parked.

When the motor is started, air is sucked into it through its conventional intake system, and also through the filter 6. Fuel vapors, and possibly fuel, accumulated in the filter element 23 are sucked into the motor and burned. The described system constitutes a sealed system where the fuel vapors cannot escape into the surrounding atmosphere and pollute same. Possible stopping up of the air cleaner 21 results in the fuel tank 1 receiving air from the motor's intake system. Therefore, no safety valve is required.

What is claimed is:

1. Arrangement for a motor vehicle fuel system, comprising a motor, a fuel tank, a filler tube connected to the fuel tank, a tank cap sealably connected to said filler tube, and a vent line opening into said fuel tank, the vent line being divided into at least two parts, e.g. a lower and an upper vent line, the vent line being connected to a filter means which is connected to the intake system of the motor, the filter means being capable of accumulating and filtering fuel vapors coming from the fuel tank, so that these vapors will not pollute the atmosphere but are instead sucked into the motor and burned when the motor is operating, the lower vent line being connected to the fuel tank, and one end of the upper vent line opening into the filler tube at a place adjacent to the tank cap, valve means operated by the tank cap, the valve means being constructed and arranged to close when the tank cap is removed and to open when the tank cap is placed on the filler tube, said valve means connected to the end of the lower vent line opening into the filler tube, the upper vent line between the filler tube and the filter being positioned substantially up to the highest point of the vehicle thereby constituting a liquid trap for a liquid-gas mixture destined for the filter means.

2. Arrangement according to claim 1, characterized in that the lower vent line opens into the filler tube through the valve means which is fixedly mounted in the upper part of the filler tube.

3. Arrangement according to claim 1, characterized in that an evacuation pipe between the fuel tank and the upper part of the filler tube opens into the fuel tank at such a place that an air pocket is formed in the fuel tank when fuel is pumped in, the volume of the air pocket being essentially equal to the volume inside of that portion of the filler tube which is located above the level of the fuel tank.

* * * * *